United States Patent [19]
Horn et al.

[11] Patent Number: 4,598,125
[45] Date of Patent: Jul. 1, 1986

[54] PREPARATION OF IMPACT-RESISTANT NYLON MOLDING MATERIALS BY ALKALINE LACTAM POLYMERIZATION

[75] Inventors: Peter Horn, Heidelberg; Hellmut Bünsch, Leimen; Robert Gehm, Limburgerhof; Matthias Marx, Bad Durkheim, all of Fed. Rep. of Germany

[73] Assignee: BASF Aktiengellschaft, Fed. Rep. of Germany

[21] Appl. No.: 567,323

[22] Filed: Dec. 30, 1983

[30] Foreign Application Priority Data

Jan. 7, 1983 [DE] Fed. Rep. of Germany ....... 3300363

[51] Int. Cl.$^4$ .................... C08F 8/30; C08L 31/00
[52] U.S. Cl. ................................ 525/183; 525/184
[58] Field of Search .............................. 525/183, 184

[56] References Cited

U.S. PATENT DOCUMENTS 3,923,925 12/1975 Schneider et al. ........... 260/857 PG
3,944,629 3/1976 Hedrick et al. .............. 260/857 PE
4,362,846 12/1982 Korber et al. ........................ 525/66
4,448,956 5/1984 Lenke et al. ......................... 525/183

Primary Examiner—John C. Bleutge
Assistant Examiner—A. L. Carrillo
Attorney, Agent, or Firm—Keil & Weinkauf

[57] ABSTRACT

Impact-resistant nylon molding materials are prepared by activated alkaline lactam polymerization by a process in which the polymerization is carried out in the presence of a graft polymer in which A. from 5 to 95 parts by weight of a rubber-like polymer having a glass transition temperature below 0° C. form the grafting base for B. from 95 to 5 parts by weight of a polyadduct, polycondensate or acrylyl polymer having a glass transition temperature above 0° C., with or without C. from 0 to 90 parts by weight of a vinyl monomer.

9 Claims, No Drawings

PREPARATION OF IMPACT-RESISTANT NYLON MOLDING MATERIALS BY ALKALINE LACTAM POLYMERIZATION

The present invention relates to a process for the preparation of nylon molding materials by activated anionic lactam polymerization. This is known per se, and is described in, for example, Kunststoff-Handbuch, Volume VI, Polyamide, Carl Hanser Verlag 1966, pages 46–49. In this process, the starting materials are two components I and II, component I being a catalyst-containing lactam melt, and component II being an activator-containing lactam melt. The two components are mixed, transported into a mold and polymerized therein. This can also be effected by the reactive injection molding (RIM) method known from polyurethane technology.

In spite of the excellent properties of the ALP polymer, the impact strength and the elongation at break are unsatisfactory for many purposes.

A few attempts to improve these properties are known. For example, improving the impact strength by mixing high molecular weight polyalkylene glycols with the polymerization mixture has been described, for example, in U.S. Pat. No. 3,923,925. The disadvantage of this process is the exudation of the polyalkylene glycols from the finished product.

The use of polymeric activators prepared from a polyetherol and an excess of a diisocyanate (isocyanate prepolymer) is described in, for example, Angewandte Makromolekulare Chemie 58/59 (1977), 321–343. However, this process gives inadequate conversions of the lactam to the polymer, particularly for the very short polymerization times which have to be maintained for the RIM method.

Block polymers of polyether and lactam, linked via ester-amide bridges, are reported in U.S. Pat. No. 3,944,629. However, this process is technically very complicated and has to be carried out under conditions which make very rigorous exclusion of moisture absolutely necessary.

It has been disclosed that nylons prepared by hydrolytic polymerization can be made impact resistant by the addition of graft polymers based on ethylene polymers (cf. for example U.S. Pat. No. 4,362,846). However, the graft polymers described therein are not suitable for imparting impact strength to polylactam prepared by alkaline polymerization: the graft copolymers are either insoluble in monomeric lactam or interfere with the polymerization.

It is an object of the present invention to provide a process for the preparation of impact-resistant nylon molding materials, in particular for RIM technology, which process overcomes the disadvantages described above.

We have found that this object is achieved by the process according to the invention.

Using this process, the nylon molding materials obtained have high impact strength and low-temperature impact strength and good elongation at break, and at the same time do not have the disadvantages of the above prior art processes.

Regarding the starting materials for the graft polymers P, the following may be stated specifically:

Suitable polymers (A) are natural rubber and commercial synthetic rubbers, as listed in, for example, The Synthetic Rubber Manual, 8th Edition, 1980 (International Institute of Synthetic Rubber Producers Inc.). Suitable classes of compounds are polydiene, polychloroprene, polybutyl, polynitrile and ethylene/α-olefin/diene (EPDM) rubbers and random copolymers obtained from dienes and copolymerizable vinyl monomers, such as styrene/butadiene rubbers, polyacrylate rubbers and ethylene/vinyl ester copolymers. Diene polymers, e.g. polydienes, block polymers containing polydiene blocks, particularly those containing blocks composed of styrene and/or acrylonitrile or of butadiene and/or isoprene, as well as styrene/butadiene rubbers and EPDM rubbers are preferred. The molecular weight of suitable rubbers (A) can be varied within wide limits; however, excessively high molecular weights result in correspondingly high solution viscosities or low concentrations during processing. Preferred rubbers are those having a molecular weight of from 500 to 500,000, particularly preferably from 2,000 to 300,000. Other suitable rubber-like polymers A are polymers which are liquid at room temperature and can be crosslinked or grafted, e.g. polybutadiene oils, polyisoprenes, or block copolymers containing polydiene blocks, with molecular weights of from 500 to 5,000. As a rule, the rubbers used have a glass transition temperature below 0° C., preferably below −10° C. In the case of the block polymers, this applies to the particular polydiene blocks. Where several rubbers are used, it is preferable to employ a mixture of high molecular weight and low molecular weight polymers A.

In another preferred embodiment of the process, the rubbers used carry reactive groups having acidic hydrogen atoms, e.g. hydroxyl groups, primary or secondary amino groups or carboxyl groups.

The amount of rubbers (A) depends on the desired degree of elastification and the amounts of starting materials (B) and, where relevant, (C) required. It is preferable to use as much as 80, particularly preferably from 25 to 75, in particular from 40 to 75% by weight, based on the sum of (A) and (B) and where relevant (C), of (A).

Starting materials of group (B) are polyadducts, polycondensates or acrylyl polymers. Preferably, they should be soluble in monomeric lactam and compatible with polylactam, and have a molecular weight of from 1,000 to 50,000, preferably from 1,000 to 40,000, in particular from 2,000 to 20,000. If the molecular weights of the polymers (B) are too low, the polymers are not as a rule sufficiently compatible with nylon, while molecular weights above 50,000 frequently result in very high viscosities during processing.

Preferred polymers (B) are those which have a sufficiently high grafting activity with regard to the vinyl monomers (C), in particular those which contain on average from 0.2 to 2, preferably from 0.5 to 1.3, olefinic double bonds per polymer molecule. The use of polymers which carry one olefinic double bond per molecule is optimum, but as a rule this is not necessary. If the double bond content is too high, undesirable crosslinking may take place. Suitable polymers (B) are in principle any polymers which meet the above requirements and are capable of undergoing a homogeneous or heterogeneous reaction with the rubbers (A) and, where relevant, the monomers (C). As a rule, it is desirable, but not absolutely necessary, for the polymers (B) to be completely converted. Examples of suitable classes of compounds are polyadducts and polycondensates, such as polyethers, in particular polyalkylene oxides, polyesters, polyurethanes, polyether-urethanes, polyester-urethanes, nylons, polyether-amides and polysulfones, acrylyl polymers having a glass transition temperature above 0° C., such as polyacrylates and polymethacrylates and copolymers of these with other vinyl monomers, and polyacrylonitrile and polymethacrylonitrile. Preferred polymers (B) containing olefinic double bonds can be obtained by reacting saturated polymers with olefinically unsaturated reagents. For example, polymers containing hydroxyl groups or primary or secondary amino groups can be reacted with olefinically unsaturated carboxylic acids, e.g. acrylic acid, methacrylic acid, maleic acid, fumaric acid or crotonic acid, or derivatives of these, such as acid halides, anhydrides, esters or half esters. If appropriate, polymers containing H-acidic groups can also be reacted with olefinically unsaturated epoxides, such as glycidyl allyl ether or glycidyl acrylate or methacrylate, or olefinically unsaturaed isocyanates. Another possibility is to react polymers containing H-acidic groups with diisocyanates and H-acidic olefinically unsaturated reagents. Polymers containing carboxyl groups can also be reacted with olefinically unsaturated alcohols or dienes capable of forming adducts. However, it is also possible for olefinically unsaturated reagents to be used directly in the preparation of the polymers, for example olefinically unsaturated carboxylic acids in the preparation of polyesters or nylons, and olefinically unsaturated alcohols in the preparation of polyesters, polyethers or polyurethanes. In the ionic polymerization of acrylonitrile, methacrylonitrile, acrylates or methacrylates, olefinically unsaturated reagents, e.g. allyl bromide, glycidyl allyl ether, glycidyl acrylate or glycidyl methacrylate, can be used for chain termination. In the polymerization, it is also possible to use chain-terminating agents or chain transfer agents which have reactive groups capable of reacting subsequently with olefinically unsaturated reagents.

The amount of polymers (B) in the graft polymers P depends essentially on the amount required in order to achieve adequate compatibility. Preferably, the graft polymers contain from 10 to 60, particularly preferably from 15 to 40% by weight of polymers (B).

Suitable monomers (C) are in principle any compounds which contain one or more vinyl double bonds and undergo free-radical polymerization; advantageously, the amount of olefinically polyunsaturated monomers is kept, as a rule, below 10% by weight, based on (C), in order to avoid undesirable crosslinking.

Preferably used monomers are those which do not contain any functional groups. These include olefins of 2 to 20 carbon atoms, vinyl-aromatics of 8 to 12 carbon atoms, acrylates and methacrylates of straight-chain, branched, cycloaliphatic and araliphatic alcohols of 1 to 20 carbon atoms, vinyl esters of carboxylic acids of 1 to 20 carbon atoms, acrylonitrile, methacrylonitrile, vinyl ethers of 3 to 20 carbon atoms, allyl ethers of 4 to 20 carbon atoms, and diesters of maleic or fumaric acid with alcohols of 1 to 20 carbon atoms.

It may be reasonable to use, in addition to these, monomers (C') which contain functional groups; the amount of these monomers should remain, as a rule, below 10% by weight, based on the sum (A)+(B)+(C). These monomers include, for example, hydroxyl-containing monomers, e.g. hydroxyethyl, hydroxypropyl or hydroxybutyl acrylate or methacrylate, allyl alcohol or monoallyl ethers of polyhydric alcohols, olefinically unsaturated carboxylic acids of 3 to 6 carbon atoms, e.g. acrylic acid, methacrylic acid maleic acid, fumaric acid or crotonic acid, and the half esters of the dicarboxylic acids, and epoxide compounds, e.g. glycidyl acrylate, glycidyl methacrylate or glycidyl allyl ether. Nitrogen-containing functional monomers, e.g. acrylamide, methacrylamide and their N-alkyl derivatives, vinylpyridine, N-vinylpyrrolidone, N-vinylcaprolactam, N-vinylformamide, dialkylaminoalkyl acrylates or methacrylates, dialkylaminoalkyl vinyl ethers or dialkylaminoalkyl allyl ethers, N-acryloyllactams and N-methacryloyllactams, are preferred.

Preferred monomers (C) are vinyl-aromatics, in particular styrene, methylstyrene or vinyltoluene, and acrylates or methacrylates of alkanols of 1 to 8 carbon atoms, especially methyl, ethyl, n- and i-butyl and 2-ethylhexyl acrylate or methacrylate, as well as vinyl acetate and vinyl propionate.

The amount of monomers (C), based on the sum of (A), (B) and (C), can be varied within wide limits. To prepare graft polymers P from those prepolymers B which themselves are not sufficiently reactive toward the polymers A, vinyl monomers C or C' must also be present. Preferably, not less than 1% by weight of monomers (C) are used. The upper limit of the amount of monomers (C) depends essentially on the choice of the amounts of rubber (A) and polymer (B). Preferably, the graft polymers P contain as much as 50% by weight of monomers (C).

The process according to the invention can also be carried out in the presence of copolymers R. These are prepared by copolymerization of A'. from 5 to 95 parts by weight of monomers which form rubber-like polymers having a glass transition temperature below 0° C. and B. from 95 to 5 parts by weight of a polyadduct or polycondensate which contains olefinic double bonds and has a glass transition temperature above 0° C., with or without C. from 0 to 90 parts by weight of vinyl monomers.

Preferred monomers A' are dienes and acrylates, in particular butadiene and/or butyl acrylate.

The graft polymers P or copolymers R used according to the invention can be prepared by polymerization of the polymers (B) and, if appropriate, the monomers (C) in the presence of the rubber (A) or of the monomers (A'), with the addition of a compound which decomposes to give free radicals, or by means of high-energy radiation. The polymerization can be carried out in emulsion, in suspension or, preferably, in solution or in non-aqueous dispersion. Preferred solvents are hydrocarbons, e.g. toluene, xylenes, hexane, cyclohexane or gasolines boiling within a range from 50° to 200° C. Particularly preferred solvents are those which boil within a range from 50° to 150° C. and in which the rubbers (A) and the polymers (B) dissolve to give solutions which do not have an excessively high viscosity. In another preferred embodiment, the monomers (C) used are employed as solvents, and, if necessary, the excess of such solvents is removed by distillation.

Suitable initiators are the conventional compounds which decompose to give free radicals, for example azo compounds, such as azoisobutyronitrile, acyl peroxides, such as benzoyl or lauroyl peroxide, alkyl peroxides, such as t-butyl peroxide, hydroperoxides, such as cumyl hydroperoxide, per-esters, such as t-butyl perpivalate, per-octoate, perneodecanoate or perbenzoate or the corresponding t-amyl esters, peracetates, persulfates or hydrogen peroxide. It may be useful to add compounds which accelerate the decomposition of the initiators (redox systems). The initiators can be used individually or as a mixture, mixtures of initiators having different half lives being preferred.

Where monomers C or C' have not been used, the graft polymers P are adducts of polymers B with polymers A; where monomers C or C' are used, the polymers A and B serve as the grafting base, the grafts being formed from monomers C or C'. The preferred, olefinically unsaturated polymers B can also be incorporated, in the form of copolymerized units, as side chains of the grafts.

Particularly preferred graft polymers P, which as such are novel, consist of

A. from 20 to 89.9% by weight of a rubber-like diene polymer having a glass transition temperature below 0° C. and a molecular weight of from 500 to 5,000, in particular block copolymers containing polybutadiene oils or polybutadiene blocks, B. from 10 to 50% by weight of a polyalkylene oxide, polyester, nylon or polyurethane having a molecular weight of from 1,000 to 40,000 and containing on average from 0.3 to 1.5 olefinic double bonds per polymer molecule, and C. from 0.1 to 40% by weight of a vinyl monomer.

Another group of preferred novel graft polymers P consists of

A. from 20 to 90% by weight of a rubber-like diene polymer having a glass transition temperature below 0° C. and a molecular weight of from 500 to 500,000, and B. from 10 to 80% by weight of a polyalkylene oxide, polyester, nylon or polyurethane having a molecular weight of from 1,000 to 40,000 and containing on average from 0.3 to 1.5 olefinic double bonds per polymer molecule.

These graft polymers are prepared by reacting components (A) and (B) at from 150° to 300° C.; the addition of free-radical initiators and solvents is not absolutely necessary. The preparation can also be carried out by reacting component (A) with $\alpha,\beta$-olefinically unsaturated dicarboxylic acids or their anhydrides, in particular maleic anhydride, and then reacting these maleated polymers (A) with polyetherols, polyesterols, polyurethanes or polyamide-amines.

The activated anionic lactam polymerization according to the invention is carried out by a conventional method. The preferred lactam is $\epsilon$-caprolactam, but it is also possible to use pyrrolidone, caprylolactam, laurolactam, enantholactam or one of the corresponding C-substituted lactams.

As a rule, the graft polymers P and R are used in amounts from 1 to 40, preferably from 5 to 30, % by weight, based on the total mixture.

In the activated alkaline lactam polymerization, the two components I and II are used as starting materials. Component I is a catalyst-containing lactam melt, and component II is an activator-containing lactam melt.

Examples of suitable catalysts are alkali metal and alkaline earth metal compounds of lactams, e.g. sodium $\epsilon$-caprolactamate, or of short-chain aliphatic carboxylic acids, e.g. sodium formate or potassium formate, or of alcohols of 1 to 6 carbon atoms, e.g. sodium methylate or potassium tert.-butylate. Alkali metal or alkaline earth metal hydrides, hydroxides or carbonates, or Grignard compounds, can also be used. The catalysts are usually employed in amounts of from 0.1 to 10 mole %, based on the total amount of lactam.

Suitable activators are N-acyllactams, e.g. N-acetylcaprolactam, substituted triazines, carbodiimides, cyanamides, mono- and polyisocyanates and blocked isocyanate compounds. They are preferably used in amounts of from 0.1 to 10 mole %.

The polymerization of the lactam can be carried out in the presence of a conventional stabilizer. A combination of CuI and KI in a molar ratio of 1:3 is particularly advantageous; the combination is added to the activator-containing component II in an amount corresponding to 50–100 ppm, based on the total amount of lactam, of copper. Other suitable stabilizers are cryptophenols and amines.

Not more than 2% by weight of nucleating agents, e.g. talc or nylon 22, with or without peroxides, can be added to the activator-containing component B.

Other conventional additives are regulators, pigments, dyes, plasticizers, fillers, fibers, flame-retarding agents and propellants.

From 1 to 30% by weight, based on the total amount of lactam, of non-crosslinked isocyanate prepolymers can also be added to the activator-containing component II. Examples of suitable substances of this type are those which are prepared by chain-lengthening of isocyanates with polyethers/polyesterols and have an isocyanate content of from 0.1 to 10% by weight. They can also be reacted, during the polymerization of the lactam, with an equivalent amount of a polyol, this being achieved by adding the polyol and, advantageously, a urethane-forming catalyst to the catalyst-containing lactam melt.

It is also possible to add from 1 to 30% by weight of lactam-soluble polymers, e.g. high molecular weight polyesters, non-crosslinked polyurethanes, polytetrahydrofuran, or nylon copolymers prepared by polycondensation.

Components I and II are mixed thoroughly at from 70° to 140° C., preferably from 100° to 135° C., transported into a mold and polymerized therein at from 120° to 200° C. The procedure used here corresponds to the reactive injection molding technique, which is described for polyurethanes by, for example, Piechota and Röhr in Integralschaumstoff, Carl-Hanser-Verlag 1975, pages 34–37.

Relatively small sheets and moldings can be produced using low-pressure metering units, the material being introduced into an open mold. In this procedure, relatively small mixing chambers with teflon-coated surfaces and teflon-coated stirring elements are preferably used.

However, the moldings according to the invention are preferably produced using a high-pressure metering unit. In this case, the components are mixed by means of a countercurrent spraying procedure.

The resulting semi-finished product can then be processed to the finished product by pressing, preferably at above the melting point of the nylon.

The moldings produced by the novel process have excellent surface quality, good mechanical properties and short molding times. They are particularly useful as shaped articles for the automotive industry, for example bodywork components, such as fenders and doors, or as components for industrial housings.

In the Examples which follow, parts and percentages are by weight. The K values were measured in accordance with Fikentscher, Cellulosechemie 13 (1932), 58; the other results are obtained in accordance with DIN.

EXAMPLES

Preparation of the polymer B1

500 parts of a polyethylene oxide obtained from 200 moles of ethylene oxide per mole of ethylene glycol, 5 parts of maleic anhydride, 5.5 parts of succinic anhydride and 100 parts of toluene are heated to 110° C. in the course of 1 hour while stirring, after which stirring is continued for a further hour at this temperature. Thereafter, volatile constituents are removed by distillation under reduced pressure, and the product is discharged in the form of a melt. The number-average molecular weight is 8,040.

Preparation of the graft polymer P1

In a flask, 25 parts of a polybutadiene oil having a molecular weight of 3,000 (component A), 8.3 parts of styrene (component C) and 0.05 part of Irganox ® 1076 (antioxidant from Ciba Geigy) are heated to 70° C. in the course of 1.5 hours while stirring, 50 parts of freshly distilled liquid ε-caprolactam are added as the solvent, and the mixture is heated at 85° C. Thereafter, 12.5 parts of the polymer B1 and 0.4 part of acryloylcaprolactam as component C' are added, the mixture is heated at 90° C., 0.06 part of a 50% strength solution of tert.-butyl per-octoate (as a polymerization initiator) in gasoline is added in the course of 5 minutes and stirring is then continued for a further 4.5 hours at from 88 to 90° C. Hydroquinone and hydroquinone monomethyl ether are then added as stabilizers, each in an amount of 0.016 part, and volatile constituents are then distilled off under reduced pressure at from 100° and 120° C. to give 3.7 parts of distillate and 92.6 parts of a solution of the graft polymer P1 in caprolactam, the solids content of the solution being 44.1% (1 hour, 120° C., 200 mbar).

The product is purified chromatographically for the structure determination, and is identified, from the pyrolysis gas chromatogram, as a polymer consisting of butadiene, ethylene glycol, styrene and acryloylcaprolactam units.

Preparation of the polymer B2

A polyether having an OH number of 19 and a number-average molecular weight of 3,800 (determined by vapor-pressure osmometry) is prepared from 2.8 parts of allyl alcohol, 200 parts of propylene oxide and 200 parts of ethylene oxide, using 0.1% of KOH as the catalyst.

Preparation of the graft polymer P2

4 parts of a polybutadiene rubber having a molecular weight of 300,000 are dissolved in 20 parts of toluene and 20 parts of styrene at room temperature, 0.06 part of Irganox ® 1076 is added and the mixture is heated to 80° C. in the course of 1.5 hours. Stirring is continued for a further 2 hours at 80° C., after which 2 parts of the polymer B2 are added, followed, after a further 30 minutes, by 0.015 part of acryloylcaprolactam and 0.025 part of a 50% strength solution of t-butylperoctoate in gasoline. The mixture is then heated to 87°-90° C., and is stirred at this temperature for 1.8 hours, after which 0.01 part of tert.-butyl p-cresol and 12 parts of freshly distilled liquid ε-caprolactam are added. Volatile constituents are then distilled off at from 100° to 120° C. under a residual pressure of not more than 50 mbar to give 36.5 parts of distillate and 21.6 parts of a solution of the graft polymer P2, the solids content of the solution being 45.1%.

Preparation of the graft polymer P3

7.2 parts of an acrylonitrile/butadiene/acrylonitrile block polymer which contains 80% by weight of butadiene, possesses secondary amino groups and has a molecular weight of 2,200, 2.4 parts of polymer B1, 12 parts of freshly distilled ε-caprolactam, 0.014 part of Irganox ® 1076, 2.2 parts of styrene and 0.2 part of methacryloylcaprolactam are heated to 80° C. in the course of 2 hours, 0.015 part of a 50% strength solution of tert.-butyl per-pivalate in an aliphatic hydrocarbon is added to the stirred mixture, and the latter is heated to 88°-92° C. and stirred at this temperature for 4.5 hours. Working up is carried out as described for the preparation of the rubber graft polymer 1. 2.1 parts of distillate and 21.9 parts of a solution of the graft polymer P3 are obtained, the solids content of the solution being 46.2%.

Preparation of the graft polymer P4

81 parts of the acrylonitrile block polymer used for the graft polymer P3, and 27 parts of the polymer B2, are heated to 225° C. under nitrogen, and stirred for a further 4 hours at this temperature. The mixture is then left to cool, and the product is discharged in the form of a melt.

The product has a number-average molecular weight (determined by vapor-pressure osmometry) of 11,500, and elemental analysis of the product obtained by reprecipitation from cold methanol gave 77.2% of C, 10.3% of H and 12.5% of 0.

Preparation of nylon moldings

EXAMPLE 1

Composition of component I:
136.6 parts of graft polymer P1,
63.64 parts of ε-caprolactam and
40.0 parts of a 15% strength solution of hexamethylene diisocyanate in caprolactam
Composition of component II:
200 parts of caprolactam and
28 parts of a 17.5% strength solution of sodium lactamate in caprolactam
Procedure:
In a low-pressure casting apparatus of the F series (Elastogran Maschinenbau, Strasslach near Munich), components I and II are mixed in a mixer head at from 125° to 135° C., using an aluminum screw mixer at 8,000 rpm. The components are mixed in a ratio of 1:1, and the mixture is discharged at a rate of 19.5 g per second. It is poured into an open mold heated at 150° C., the molding time being 1.5 minutes.
Product properties:
Notched impact strength (DIN 53,453)
at 23° C.: not broken
at −20° C.: 19 kJ.m$^{-2}$
Elongation at break (DIN 53,455): 137%
Shore D hardness (DIN 53,504): 66

EXAMPLE 2

Composition of component I:
136.36 parts of graft polymer P2
63.64 parts of caprolactam and
40 parts of a 15% strength solution of hexamethylene diisocyanate in caprolactam.
Composition of component II:

200 parts of caprolactam and
28 parts of a 17.5% strength solution of sodium lactamate in caprolactam.

The procedure is carried out as described in Example 1.

Product properties:
Notched impact strength
 at 23° C.: 87 kJ.m$^{-2}$
 at −20° C.: 12 kJ.m$^{-2}$
Elongation at break: 30%
Shore D hardness: 70

EXAMPLE 3

Composition of component I:
130.43 parts of graft polymer P3,
62.57 parts of caprolactam and
50 parts of a 15% strength solution of hexamethylene diisocyanate in caprolactam.
Composition of component II:
207 parts of caprolactam and
36 parts of a 17.5% strength solution of sodium lactamate in caprolactam.

The procedure is carried out as described in Example 1.

Product properties:
Notched impact strength
 at 23° C.: not broken
 at −20° C.: 30.7 kJ.m$^{-2}$
Elongation at break: 107%
Shore D hardness: 75

EXAMPLE 4

Composition of component I:
60 parts of graft polymer P4,
140 parts of caprolactam and
40 parts of a 15% strength solution of hexamethylene diisocyanate in caprolactam.
Composition of component II:
200 parts of caprolactam and
28 parts of a 17.5% strength solution of sodium lactamate in caprolactam.

The procedure is carried out as described in Example 1.

Product properties:
Notched impact strength
 at 23° C.: not broken
 at −20° C.: 31 kJ.m$^{-2}$
Elongation at break: 100%
Shore D hardness: 71

We claim:

1. A process for the preparation of an impact-resistant nylon molding material by activated alkaline polymerization of lactams, wherein the polymerization is carried out in the presence of a graft polymer P, in which
  A. from 5 to 95 parts by weight of an elastomeric polymer having a glass transition temperature below 0° C. and a molecular weight of from 500 to 5,000 from the grafting base for
  B. from 95 to 5 parts by weight of a polyether containing an average from 0.2 to 2.0 olefinic double bonds per polymer molecule and which has a glass transition temperature above 0° C., with or without
  C. from 9 to 90 parts by weight of vinyl monomers.

2. A process as claimed in claim 1, wherein the polymer A is a diene polymer having a molecular weight of from 500 to 500,000.

3. A process as claimed in claim 1, wherein the polymer A is a polybutadiene oil having a molecular weight of from 500 to 5,000.

4. A process as claimed in claim 1, wherein the polymer A carries reactive groups having acidic hydrogen atoms.

5. A process as claimed in claim 1, wherein the vinyl monomer C is styrene.

6. A process as claimed in claim 1, wherein a vinyl monomer C′ carrying functional groups is added in an amount of less than 10% by weight, based on the sum of A, B and C.

7. A process as claimed in claim 1, wherein, in the alkaline lactam polymerization, a component (I), which contains a lactam and a catalyst, and a component (II), which contains a lactam and an activator, are mixed thoroughly at from 70° to 140° C., transported into a mold and polymerized therein at from 120° to 200° C.

8. A process as claimed in claim 7, wherein the polymerization is carried out by the reactive injection molding technique.

9. A process as claimed in claim 7, wherein a kryptophenol, an amine, or a mixture of CuI and KI in a molar ratio of 1:3, is added, as a stabilizer, to the activator-containing component (II).

* * * * *